United States Patent
Jeong et al.

(10) Patent No.: US 10,685,603 B2
(45) Date of Patent: Jun. 16, 2020

(54) ALL-AROUND DISPLAY DEVICE AND PIXEL IN THE SAME

(71) Applicant: Samsung Display Co., Ltd., Yongin-si, Gyeonggi-do (KR)

(72) Inventors: Heesoon Jeong, Hwaseong-si (KR); Hae-Kwan Seo, Hwaseong-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 16/002,833

(22) Filed: Jun. 7, 2018

(65) Prior Publication Data
US 2018/0374425 A1    Dec. 27, 2018

(30) Foreign Application Priority Data
Jun. 21, 2017 (KR) .................... 10-2017-0078698

(51) Int. Cl.
  *G09G 3/3258*   (2016.01)
  *G06F 3/041*    (2006.01)
  *G09G 3/3233*   (2016.01)

(52) U.S. Cl.
  CPC ......... *G09G 3/3258* (2013.01); *G06F 3/0412* (2013.01); *G09G 3/3233* (2013.01);
  (Continued)

(58) Field of Classification Search
  CPC ... G06F 3/0412; G09G 3/3258; G09G 3/3233
  See application file for complete search history.

(56) References Cited

U.S. PATENT DOCUMENTS

| 8,723,824 B2 | 5/2014 | Myers et al. |
| 9,578,149 B2 | 2/2017 | Moon et al. |

(Continued)

FOREIGN PATENT DOCUMENTS

| EP | 3109853 A2 | 12/2016 |
| EP | 3373280 A1 | 9/2018 |

(Continued)

OTHER PUBLICATIONS

EPO Partial Search Report dated Oct. 12, 2018, for corresponding European Patent Application No. 18179182.3 (16 pages).

*Primary Examiner* — Kwang-Su Yang
(74) *Attorney, Agent, or Firm* — Lewis Roca Rothgerber Christie LLP

(57) ABSTRACT

An all-around display device according to embodiments includes a display panel including first to J-th display areas having pixels and respectively corresponding to surfaces, a gate driver for providing a gate signal to the display panel through first to N-th gate lines, and for providing an initialization signal to the display panel through first to N-th initialization lines, an emission driver for providing an emission control signal to the display panel through first to N-th emission control lines, a display area control driver for providing first to J-th global control signals respectively corresponding to the first to J-th display areas to selectively determine light emission of each of the first to J-th display areas, and a data driver for providing a data voltage to the display panel through data lines, wherein J is an integer that is greater than 1, and N is an integer that is greater than J.

20 Claims, 11 Drawing Sheets

(52) U.S. Cl.
CPC .......... *G09G 2300/0819* (2013.01); *G09G 2300/0842* (2013.01); *G09G 2300/0861* (2013.01); *G09G 2310/0221* (2013.01); *G09G 2310/0232* (2013.01); *G09G 2330/021* (2013.01); *G09G 2330/023* (2013.01); *G09G 2330/027* (2013.01); *G09G 2380/02* (2013.01)

(56) References Cited

U.S. PATENT DOCUMENTS

| | | | |
|---|---|---|---|
| 2014/0118319 A1* | 5/2014 | Jeon | G06F 1/00 345/207 |
| 2015/0227173 A1* | 8/2015 | Hwang | G06F 1/1652 345/619 |
| 2016/0125809 A1* | 5/2016 | Hwang | G02F 1/13 345/212 |
| 2017/0097715 A1* | 4/2017 | Kim | H04M 1/0266 |

FOREIGN PATENT DOCUMENTS

| | | |
|---|---|---|
| KR | 10-2016-0059575 | 5/2016 |
| WO | WO 2017/082685 A1 | 5/2017 |

\* cited by examiner

ALL-AROUND DISPLAY DEVICE AND PIXEL IN THE SAME

CROSS REFERENCE TO RELATED APPLICATION

This application claims priority to, and the benefit of, Korean Patent Application No. 10-2017-0078698, filed on Jun. 21, 2017 in the Korean Intellectual Property Office (KIPO), the disclosure of which is hereby incorporated by reference herein in its entirety.

BACKGROUND

1. Field

Embodiments of the inventive concept relate to display devices, such as an all-around display device including a flexible (or a curved) display panel, and a pixel in the same.

2. Discussion of Related Art

A display device displays an image based on lights emitted from pixels, and an organic light emitting display device includes pixels having organic light emitting diodes. The organic light emitting diode emits light having a wavelength corresponding to an organic material therein.

In recent years, an edge display, which displays images on not only a front surface of an electronic device, but also on a plurality of sides, has been developed. The display device may be improved to an all-around display device for displaying images through the plurality of sides (e.g., a plurality of display areas) by bending and shaping a single display panel. However, it is not necessary to always output image information from all screens according to the user's environment or operation. Accordingly, there is a need for a technique for selectively driving the screens corresponding to the respective sides to reduce power consumption of the all-around display device.

SUMMARY

Embodiments provide an all-around display device including a display area controller for selectively displaying images at a plurality of display areas.

Embodiments provide a pixel structure included in all-around display device.

According to embodiments, a display device may include a display panel including first to J-th display areas each having a plurality of pixels and respectively corresponding to a plurality of surfaces, a gate driver for providing a gate signal to the display panel through first to N-th gate lines, and for providing an initialization signal to the display panel through first to N-th initialization lines, an emission driver for providing an emission control signal to the display panel through first to N-th emission control lines, a display area control driver for providing first to J-th global control signals respectively corresponding to the first to J-th display areas to selectively determine light emission of each of the first to J-th display areas, and a data driver for providing a data voltage to the display panel through data lines, wherein J is an integer that is greater than 1, and N is an integer that is greater than J.

In one of the embodiments, each of the pixels includes a first transistor connected between a data line and a first node, and including a gate electrode to receive the gate signal, a driving transistor for generating a driving current, and connected between the first node and a second node, and including a gate electrode connected to a third node, a second transistor connected between the second node and the third node, and including a gate electrode to receive the gate signal, a third transistor connected between the third node and an initialization power source for providing an initialization voltage, and including a gate electrode to receive an initialization signal, a fourth transistor connected between a first power source for providing a first power voltage and the first node, and including a gate electrode to receive the emission control signal, a fifth transistor connected between the second node and a fourth node, and including a gate electrode to receive the emission control signal, a sixth transistor connected between the initialization power source and the fourth node, and including a gate electrode to receive the gate signal, a seventh transistor connected between an emission control line and both of the gate electrodes of the fourth and fifth transistors, and including a gate electrode to receive one of the first to J-th global control signals, a storage capacitor connected between the first power source and the third node, and an organic light emitting diode connected between the fourth node and a second power source for providing a second power voltage that is less than the first power voltage.

In one of the embodiments, the display area control driver is for outputting an active level of a K-th global control signal corresponding to a K-th display area to display an image, where K is a positive integer that is less than or equal to J.

In one of the embodiments, the K-th global control signal corresponding to the K-th display area has the same waveform as the emission control signal applied to the first emission control line.

In one of the embodiments, the display area control driver is for outputting an inactive level of an I-th global control signal corresponding to an I-th display area to prevent an image from being displayed thereon, where I is a positive integer that is less than or equal to J.

In one of the embodiments, the emission control signal is prevented from being applied to the gate electrodes of the fourth transistor and the fifth transistor by the I-th global control signal having the inactive level.

In one of the embodiments, the K-th global control signal maintains the active level in frames after an image display start frame when the K-th display area displays the image during consecutive frames.

In one of the embodiments, a non-emission period in which the emission control signal has an inactive level includes a first period for initializing a voltage of the third node, and a second period after the first period for writing the data voltage, for compensating a threshold voltage of the driving transistor, and for initializing a voltage of the fourth node.

In one of the embodiments, in the first period, the initialization signal has an active level, and the gate signal has an inactive level.

In one of the embodiments, in the second period, the initialization signal has an inactive level, and the gate signal has an active level.

In one of the embodiments, the display panel is a flexible display panel in which each boundary between adjacent ones of the surfaces is bent.

In one of the embodiments, the panel further includes a touch driver for detecting a touch on the display panel, and a timing controller for controlling the gate driver, the emission driver, the display area control driver, the data driver, and the touch driver.

In one of the embodiments, the display area control driver is for outputting a global control signal that corresponds to a touched display area of the first to J-th display areas and that is at an active level during an active period of the emission control signal applied to the first emission control line.

In one of the embodiments, the timing controller is for providing a control signal to the display area control driver to determine whether to activate any or all of the first to J-th global control signals based on a touch detection that is output from the touch driver.

In one of the embodiments, a K-th global control signal is applied commonly to the pixels in a K-th display area, K being a positive integer that is less than or equal to J.

In one of the embodiments, each of the pixels includes a first transistor connected between a data line and a first node, and including a gate electrode to receive the gate signal, a driving transistor for generating a driving current, connected between the first node and a second node, and including a gate electrode connected to a third node, a second transistor connected between the second node and the third node, and including a gate electrode to receive the gate signal, a third transistor connected between the third node and an initialization power source providing an initialization voltage, and including a gate electrode to receive an initialization signal, a fourth transistor connected between a first power source providing a first power voltage and the first node, and including a gate electrode to receive the emission control signal, a fifth transistor connected between the second node and a fourth node, and including a gate electrode to receive one of the first to J-th global control signals corresponding to a display area including the pixel, a sixth transistor connected between the initialization power source and the fourth node, and including a gate electrode to receive the gate signal, a storage capacitor connected between the first power source and the third node, and an organic light emitting diode connected between the fourth node and a second power source for providing a second power voltage that is less than the first power voltage.

In one of the embodiments, a K-th global control signal corresponding to a K-th display area has an active level during an active period of the emission control signal applied to the first emission control line to display an image on the K-th display area, where K is a positive integer that is less than or equal to J.

In one of the embodiments, each of the pixels includes a first transistor connected between a data line and a first node, and including a gate electrode to receive the gate signal, a driving transistor for generating a driving current, connected between the first node and a second node, and including a gate electrode connected to a third node, a second transistor connected between the second node and the third node, and including a gate electrode to receive the gate signal, a third transistor connected between the third node and an initialization power source for providing an initialization voltage, and including a gate electrode to receive an initialization signal, a fourth transistor connected between a first power source for providing a first power voltage and the first node, and including a gate electrode to receive one of the first to J-th global control signals corresponding to a display area including the pixel, a fifth transistor connected between the second node and a fourth node, and including a gate electrode to receive the emission control signal, a sixth transistor connected between the initialization power source and the fourth node, and including a gate electrode to receive the gate signal, a storage capacitor connected between the first power source and the third node, and an organic light emitting diode connected between the fourth node and a second power source for providing a second power voltage that is less than the first power voltage.

According to embodiments, a pixel may include a first transistor connected between a data line and a first node, and including a gate electrode to receive a K-th gate signal, a driving transistor for generating a driving current, connected between the first node and a second node, and including a gate electrode connected to a third node, a second transistor connected between the second node and the third node, and including a gate electrode to receive the K-th gate signal, a third transistor connected between the third node and an initialization power source for providing an initialization voltage, and including a gate electrode to receive a K-th initialization signal, a fourth transistor connected between a first power source for providing a first power voltage and the first node, and including a gate electrode to receive a K-th emission control signal, a fifth transistor connected between the second node and a fourth node, and including a gate electrode to receive the K-th emission control signal, a sixth transistor connected between the initialization power source and the fourth node, and including a gate electrode to receive the K-th gate signal, a seventh transistor connected between an emission control line and both of the gate electrodes of the fourth and fifth transistors, and including a gate electrode to receive a global control signal, a storage capacitor connected between the first power source and the third node, and an organic light emitting diode connected between the fourth node and a second power source for providing a second power voltage that is less than the first power voltage, wherein K is an integer that is greater than 0.

In one of the embodiments, the K-th emission control signal is prevented from being applied to the gate electrodes of the fourth transistor and the fifth transistor by the global control signal having an inactive level.

Therefore, the all-around display device according to the described embodiments may selectively and independently control the light emission of each of the display areas based on the global control signals. Further, the light emission of the pixels included in each display area may be controlled in common within each frame by the global control signals. Therefore, the display areas may be selectively driven according to suitability of the user, and unnecessary power consumption may be reduced.

BRIEF DESCRIPTION OF THE DRAWINGS

Embodiments can be understood in more detail from the following description taken in conjunction with the accompanying drawings, in which.

DETAILED DESCRIPTION

Figure 1:
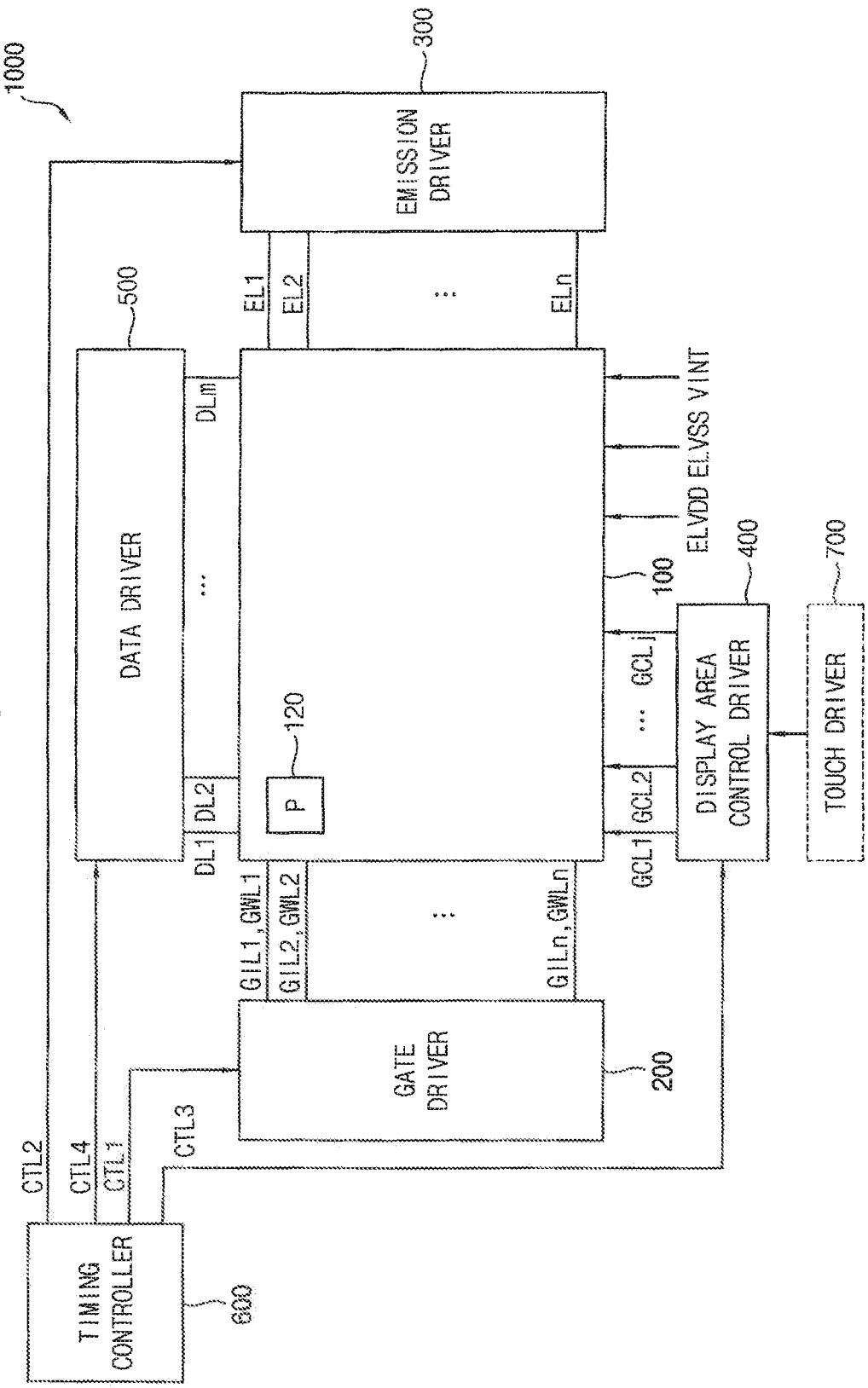
FIG. 1 is a block diagram of an all-around display device according to embodiments.

Features of the inventive concept and methods of accomplishing the same may be understood more readily by reference to the following detailed description of embodiments and the accompanying drawings. Hereinafter, embodiments will be described in more detail with reference to the accompanying drawings, in which like reference numbers refer to like elements throughout. The present invention, however, may be embodied in various different forms, and should not be construed as being limited to only the illustrated embodiments herein. Rather, these embodiments are provided as examples so that this disclosure will be thorough and complete, and will fully convey the aspects and features of the present invention to those skilled in the art. Accordingly, processes, elements, and techniques that are not necessary to those having ordinary skill in the art for a complete understanding of the aspects and features of the present invention may not be described. Unless otherwise noted, like reference numerals denote like elements throughout the attached drawings and the written description, and thus, descriptions thereof will not be repeated. In the drawings, the relative sizes of elements, layers, and regions may be exaggerated for clarity.

In the following description, for the purposes of explanation, numerous specific details are set forth to provide a thorough understanding of various embodiments. It is apparent, however, that various embodiments may be practiced without these specific details or with one or more equivalent arrangements. In other instances, well-known structures and devices are shown in block diagram form in order to avoid unnecessarily obscuring various embodiments.

It will be understood that, although the terms "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present invention.

Spatially relative terms, such as "beneath," "below," "lower," "under," "above," "upper," and the like, may be used herein for ease of explanation to describe one element or feature's relationship to another element(s) or feature(s) as illustrated in the figures. It will be understood that the spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly.

It will be understood that when an element, layer, region, or component is referred to as being "on," "connected to," or "coupled to" another element, layer, region, or component, it can be directly on, connected to, or coupled to the other element, layer, region, or component, or one or more intervening elements, layers, regions, or components may be present. However, "directly connected/directly coupled" refers to one component directly connecting or coupling another component without an intermediate component. In addition, it will also be understood that when an element or layer is referred to as being "between" two elements or layers, it can be the only element or layer between the two elements or layers, or one or more intervening elements or layers may also be present.

For the purposes of this disclosure, expressions such as "at least one of," when preceding a list of elements, modify the entire list of elements and do not modify the individual elements of the list. For example, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. Like numbers refer to like elements throughout. As used herein, the term "and/or" includes any and all combinations of one or more of the associated listed items.

The terminology used herein is for the purpose of describing particular embodiments only and is not intended to be limiting of the present invention. As used herein, the singular forms "a" and "an" are intended to include the plural forms as well, unless the context clearly indicates otherwise. It will be further understood that the terms "comprises," "comprising," "includes," and "including," when used in this specification, specify the presence of the stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

As used herein, the term "substantially," "about," "approximately," and similar terms are used as terms of approximation and not as terms of degree, and are intended to account for the inherent deviations in measured or calculated values that would be recognized by those of ordinary skill in the art. "About" or "approximately," as used herein, is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" may mean within one or more standard deviations, or within ±30%, 20%, 10%, 5% of the stated value. Further, the use of "may" when describing embodiments of the present invention refers to "one or more embodiments of the present invention." As used herein, the terms "use," "using," and "used" may be considered synonymous with the terms "utilize," "utilizing," and "utilized," respectively. Also, the term "exemplary" is intended to refer to an example or illustration.

When a certain embodiment may be implemented differently, a specific process order may be performed differently from the described order. For example, two consecutively described processes may be performed substantially at the same time or performed in an order opposite to the described order.

Various embodiments are described herein with reference to sectional illustrations that are schematic illustrations of embodiments and/or intermediate structures. As such, variations from the shapes of the illustrations as a result, for example, of manufacturing techniques and/or tolerances, are to be expected. Thus, embodiments disclosed herein should not be construed as limited to the particular illustrated shapes of regions, but are to include deviations in shapes that result from, for instance, manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the drawings are schematic in nature and their shapes are not intended to illustrate the actual shape of a region of a device and are not intended to be limiting.

The electronic or electric devices and/or any other relevant devices or components according to embodiments of the present invention described herein may be implemented utilizing any suitable hardware, firmware (e.g. an application-specific integrated circuit), software, or a combination of software, firmware, and hardware. For example, the various components of these devices may be formed on one integrated circuit (IC) chip or on separate IC chips. Further, the various components of these devices may be implemented on a flexible printed circuit film, a tape carrier package (TCP), a printed circuit board (PCB), or formed on one substrate. Further, the various components of these devices may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the spirit and scope of the exemplary embodiments of the present invention.

Unless otherwise defined, all terms (including technical and scientific terms) used herein have the same meaning as commonly understood by one of ordinary skill in the art to which the present invention belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

Figure 2:
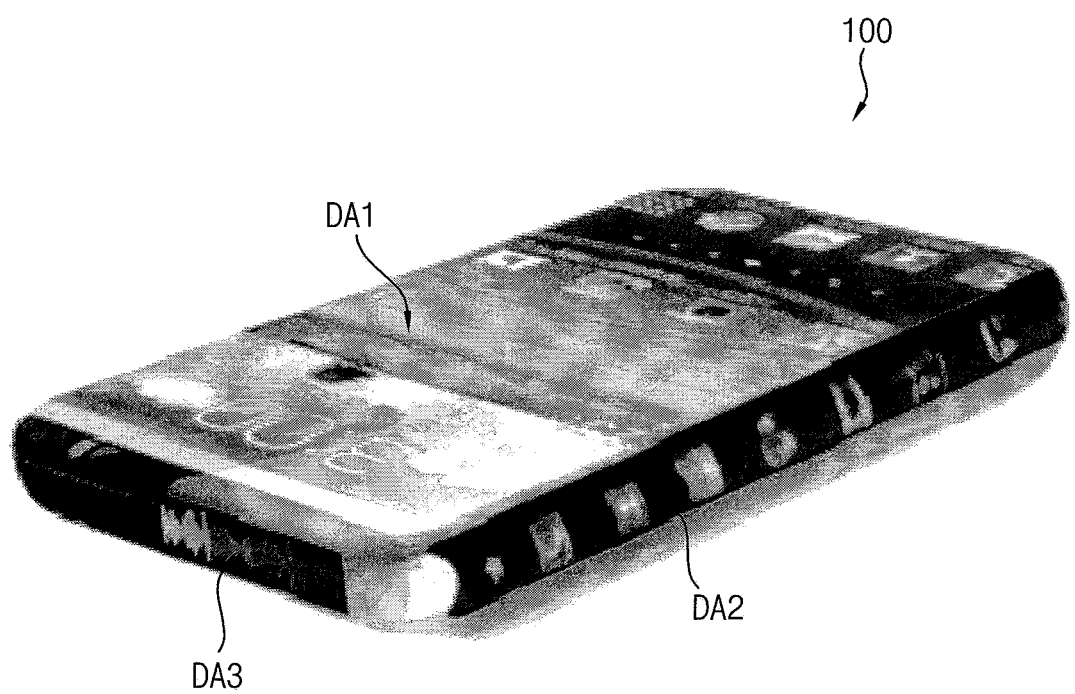
FIG. 2 is a diagram illustrating an example of the all-around display device of FIG. 1.

FIG. 1 is a block diagram of an all-around display device according to embodiments. FIG. 2 is a diagram illustrating an example of the all-around display device of FIG. 1.

Referring to FIGS. 1 and 2, the all-around display device (e.g. a multi-sided display device having display areas on multiple sides thereof) 1000 may include a display panel 100, a gate driver 200, an emission driver 300, a display area control driver 400, and a data driver 500. The all-around display device 1000 may further include a timing controller 600 and a touch driver 700.

The all-around display device 1000 may be an organic light emitting display device. The all-around display device 1000 may be applied to a curved display device, a bent (bendable) display device, a flexible display device, a transparent display device, a head mounted display device, and the like.

The display panel 100 may include a plurality of gate lines GWL1 to GWLn, a plurality of initialization lines GIL1 to GILn, a plurality of emission control lines EL1 to ELn, a plurality of data lines EL1 to ELn, a plurality of data lines DL1 to DLm, a plurality of global control lines GCL1 to GCLj, and a plurality of pixels 120 respectively connected to the gate lines GWL1 to GWLn, the initialization lines GIL1 to GILn, the emission control lines EL1 to ELn, the data lines DL1 to DLm, and the global control lines GCL1 to GCLj, where n, m, and j are integers that are greater than 1. In some embodiments, the display panel 100 may be implemented as a curved (or bent) display panel or a flexible display panel, and may include a plurality of display areas (e.g., display areas DA1, DA2, and DA3, as shown in FIG. 2) corresponding to respective surfaces as illustrated in FIG. 2. Each of the display areas may include a plurality of the pixels 120.

In some embodiments, the display panel 100 may be the flexible (or the curved) display panel in which each boundary between adjacent ones of the surfaces is bent.

Each of the pixels 120 may include a driving transistor and one or more switching transistors. The pixel 120 may include a transistor connected to one of the global control lines GCL1 to GCLj to control an input of an emission control signal. Structures of the pixel 120 will be described in detail with reference to FIGS. 6, 10, and 11.

The gate driver 200 may sequentially provide a gate signal to first to N-th gate lines GWL1 to GWLn, and may sequentially provide an initialization signal to first to N-th initialization lines GIL1 to GILn, based on a first control signal CTL1. In some embodiments, the initialization signal may be substantially the same as a gate signal of a previous stage. For example, the gate signal corresponding to the previous pixel row and the initialization signal corresponding to the current pixel row may be simultaneously output through a single stage circuit in the gate driver 200.

The emission driver 300 may provide the emission control signal to the pixels 120 through first to N-th emission control lines EL1 to ELn based on a second control signal CTL2.

The display area control driver 400 may provide first to J-th global control signals to the respective display areas through first to J-th global control lines GCL1 to GCLj based on a third control signal CTL3. The display area control driver 400 may selectively determine (control) emissions of the first to J-th display areas using the first to J-th global control signals. The first to J-th global control signals may be commonly provided to the display areas, respectively. For example, the first global control signal may be commonly provided to the pixels in a first display area.

In some embodiments, as illustrated in FIG. 2, the display areas may be divided into, or categorized as, three to six surfaces depending on a shape of the display panel. However, this is an example, and the number and position of the display areas are not limited thereto.

In some embodiments, the display area control driver 400 may output an active level of a K-th global control signal corresponding to a K-th display area to display an image, where K is a positive integer that is less than or equal to J.

Here, when a plurality of display areas display images, a plurality of corresponding global control signals may be output at the active level.

In some embodiments, the K-th global control signal corresponding to the K-th display area may have the same waveform as the emission control signal applied to the first emission control line to display an image on the K-th display area.

The data driver 500 may provide a data voltage (data signal) to the pixels 120 through the data lines DL1 to DLm based on a fourth control signal CTL4.

The timing controller 600 may generate the first to fourth control signals CTL1 to CTL4 to control the gate driver 200, the emission driver 300, the display area control driver 400, and the data driver 500. The first control signal CTL1 for controlling the gate driver 200 may include a gate start signal, a gate clock signal, etc. The second control signal CTL2 for controlling the emission driver 300 may include an emission start signal, an emission control clock signal, etc. The third control signal CTL3 for controlling the display area control driver 400 may activate at least one of the first to J-th global control signal. The fourth control signal CTL4 for controlling the data driver 500 may include image data, horizontal start signal, etc.

The all-around display device 1000 may include a power supply for providing a first power voltage ELVDD, a second power voltage ELVSS, and an initialization voltage VINT to the display panel 100, and may include a touch driver 700 for detecting a touch on the display panel 100. In some embodiments, the display area control driver 400 may output a global control signal corresponding to a touched display area of the first to J-th display areas at an active level during an active period of the emission control signal applied to the first emission control line EL1. The timing controller 600 may generate the third control signal CTL3 to determine whether to activate each of the first to J-th global control signals based on a touch detection output from the touch driver 700.

As described above, the all-around display device 1000 according to embodiments may provide the global control signals to the respective display areas to selectively control the emission of the display areas. Thus, the selective driving of the display areas may be enabled by the circuit structure, and the power consumption of the all-around display device 1000 may be reduced.

Figure 3:
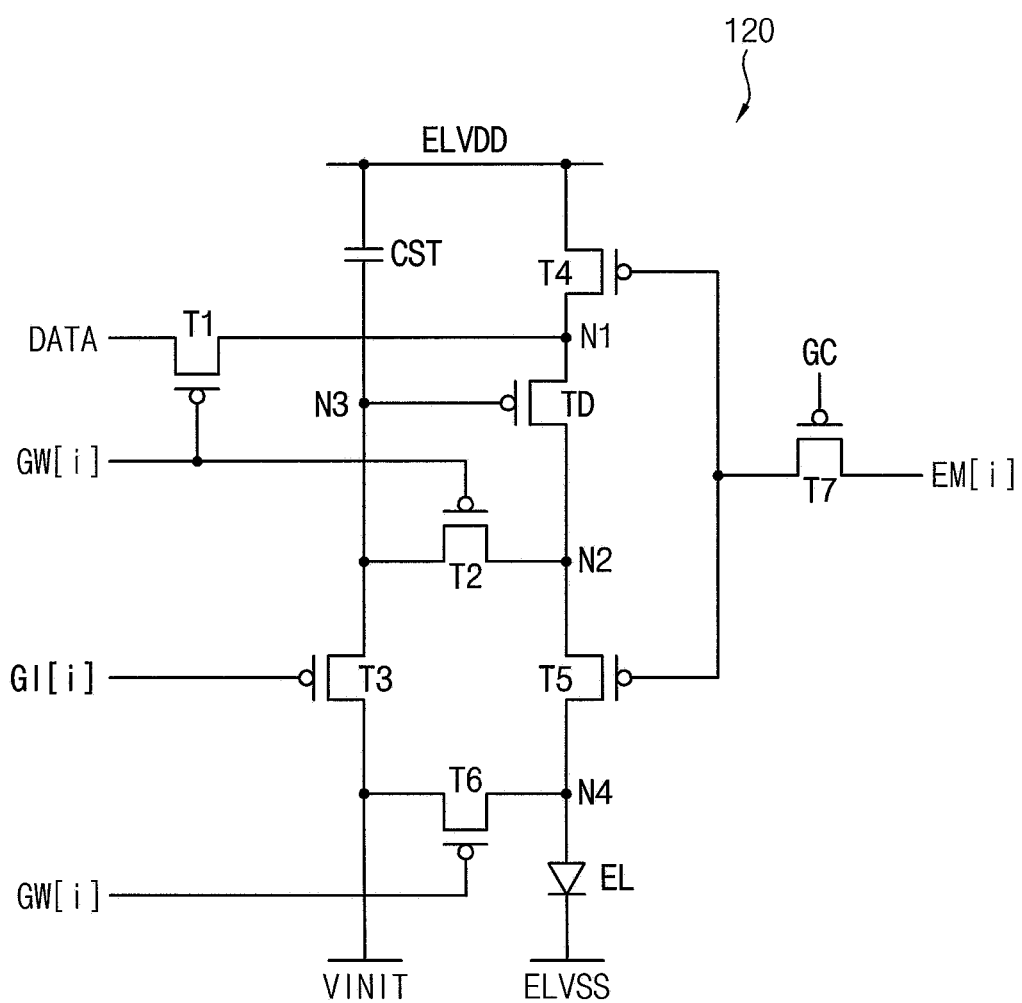
FIG. 3 is a circuit diagram illustrating an example of a pixel included in the all-around display device of FIG. 1.
Figure 4:
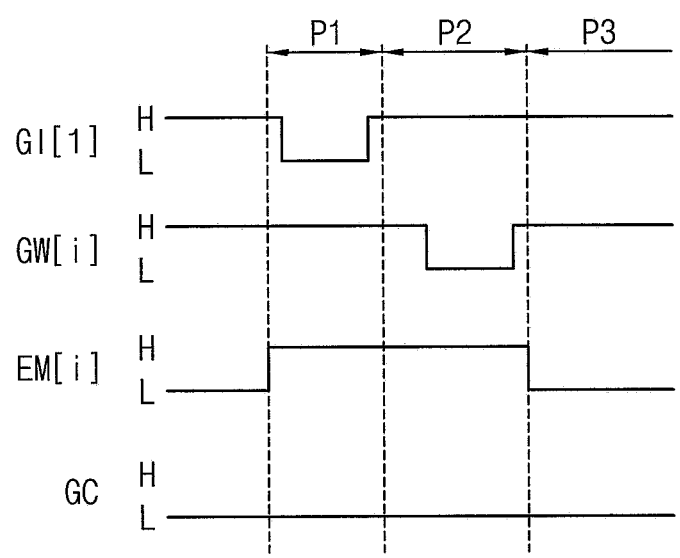
FIG. 4 is a timing diagram illustrating an example of signals applied to the pixel of FIG. 3.

FIG. 3 is a circuit diagram illustrating an example of a pixel included in the all-around display device of FIG. 1. FIG. 4 is a timing diagram illustrating an example of signals applied to the pixel of FIG. 3.

Referring to FIGS. 3 and 4, the pixel 120 may include a driving transistor TD, first to seventh transistors T1 to T7, a storage capacitor CST, and an organic light emitting diode EL. The pixel 120 may be arranged in an I-th pixel row, where I is a positive integer that is less than or equal to n.

The driving transistor TD may provide a driving current corresponding to a data signal DATA to the organic light emitting diode EL. The driving transistor TD may be connected between a first node N1 and a second node N2. A gate electrode of the driving transistor TD may be connected to a third node N3.

The first transistor T1 may provide the data signal DATA to the first node N1 in response to the gate signal GW[i]. The first transistor T1 may be connected between a data line and the first node N1. A gate electrode of the first transistor T1 may receive the gate signal GW[i].

The second transistor T2 may electrically connect the second node N2 and the third node N3 (e.g., a second electrode of the driving transistor TD and the gate electrode of the driving transistor TD) in response to the gate signal GW[i]. The second transistor T2 may be connected between the second node N2 and the third node N3. The second transistor T2 may include a gate electrode to receive the gate signal GW[i]. The second transistor T2 may be used for threshold voltage compensation of the driving transistor TD. The driving transistor TD may be diode-connected by the turn-on of the second transistor T2 (by the second transistor T2 being turned on). Thus, the threshold compensation operation of the driving transistor TD may be performed.

The third transistor T3 may provide the initialization voltage VINT to the third node N3 (e.g., the gate electrode of the driving transistor TD) in response to the initialization signal GI[i]. The third transistor T3 may be connected between an initialization voltage source providing the initialization voltage VINT and the third node N3. The third transistor T3 may include a gate electrode to receive the initialization signal GI[i]. The third transistor T3 may be used to initialize the gate voltage of the driving transistor TD to the initialization voltage VINT.

The fourth transistor T4 may provide the first power supply voltage ELVDD to the first node N1 in response to the emission control signal EM[i]. The fourth transistor T4 may be connected between a first power source providing the first power supply ELVDD and the first node N1. The fourth transistor T4 may include a gate electrode to receive the emission control signal EM[i].

The fifth transistor T5 may electrically connect the driving transistor TD and an anode electrode of the organic light emitting diode EL in response to the emission control signal EM[i]. The fifth transistor T5 may be connected between the second node N2 and the fourth node N4. The fifth transistor T5 may include a gate electrode to receive the emission control signal EM[i].

The sixth transistor T6 may provide the initialization voltage VINT to the fourth node N4 (that is, to the anode electrode of the organic light emitting diode EL) in response to the gate signal GW[i]. The sixth transistor T6 may be connected between the initialization power source and the fourth node N4. The sixth transistor T6 may include a gate electrode to receive the initialization signal GI[i]. The sixth transistor T6 may be used to initialize the anode voltage of the organic light emitting diode EL to the initialization voltage VINT.

The seventh transistor T7 may control whether the emission control signal EM[i] is applied to the pixel 120 (that is, to the gate electrodes of the fourth and fifth transistors T4 and T5) in response to the global control signal GC. The seventh transistor T7 may be connected between the emission control line and the gate electrodes of the fourth and fifth transistors T4 and T5. A gate electrode of the seventh transistor T7 may receive the global control signal GC. The global control signal GC may be one of the plurality of global control signals corresponding to a display area including the corresponding pixel 120.

The provision of the emission control signal EM[i] may be cut off, and the pixel 120 cannot emit light, when the seventh transistor T7 is turned off.

The storage capacitor CST may be connected between the first power source providing the first power voltage ELVDD and the third node N3.

The organic light emitting diode EL may be connected between the fourth node and a second power source providing the second power voltage ELVSS. The second power voltage ELVSS may be less than the first power voltage ELVDD.

The global control signal GC may have the active level L when the display area having the pixel 120 displays an image. In the present embodiment, the pixel 120 is formed of P-channel metal oxide semiconductor (PMOS) transistors. Therefore, a logical low level L of the signals will be described as the active level L, and a logical high level H of the signals will be described as an inactive level H. However, this is an example, and the active level of the signals may be the logical high level H when the transistors are N-channel metal oxide semiconductor (NMOS) transistors.

The global control signal GC may have the active level H, as illustrated in FIG. 4, when the I-th pixel row is not a first pixel row. The global control signal GC may have the same waveform as a first emission control signal applied to the first pixel row when the I-th pixel row is the first pixel row.

Each pixel 120 may be driven in a non-emission period P1 and P2 in which the emission control signal EM[i] has the inactive level H and an emission period P3 in which the emission control signal EM[i] has the active level L. In some embodiments, the non-emission period may include a first period P1 for initializing a voltage of the third node N3 (e.g., the gate voltage of the driving transistor), a second period P2 after the first period P1 for writing the data voltage DATA (or a data signal), for compensating a threshold voltage of the driving transistor TD, and for initializing a voltage of the fourth node N4 (e.g., the anode voltage of the organic light emitting diode). In some embodiments, the global control signal GC may have the active level L in all of the periods P1, P2, and P3, and the seventh transistor T7 may maintain a turn-on state.

In the first period P1, the initialization signal GI[i] may have the active level L and the gate signal GW[i] may have the inactive level H. Accordingly, the third transistor T3 may be turned on, and the gate voltage of the driving transistor TD may be initialized to the initialization voltage VINT. At this time, the emission control signal EM[i] may maintain the inactive level H.

In the second period P2, the initialization signal GI[i] may change to the inactive level H and the gate signal GW[i] may have the active level L. Accordingly, the first, second, and sixth transistors T1, T2, and T6 may be turned on, and the third transistor T3 may be turned off. Thus, the data voltage DATA may be applied to the first node N1 (e.g., to a first electrode (source electrode) of the driving transistor TD), the driving transistor TD may be diode-connected, and the threshold compensation of the driving transistor TD may be performed. The anode voltage of the organic light emitting diode EL (e.g., the voltage of the fourth node N4) may be initialized to the initialization voltage VINT at the same time as the threshold compensation. Here, the emission control signal EM[i] may maintain the inactive level H.

In some embodiments, an I-th initialization signal GI[i] may be substantially the same as an (I−1)-th gate signal GW[i−1].

In the emission period P3, the initialization signal GIN and the gate signal GW[i] may have the inactive level H, and the emission control signal EM[i] may have the active level L. Accordingly, the fourth and fifth transistors T4 and T5 may be turned on, and the organic light emitting diode EL may emit light with a luminance corresponding to the data voltage DATA.

In some embodiments, when the global control signal GC is applied at the inactive level H, the seventh transistor T7 of all the pixels included in the corresponding display area may be turned off. Thus, all pixels in the corresponding display area may be inactivated without emitting light.

Figure 5:
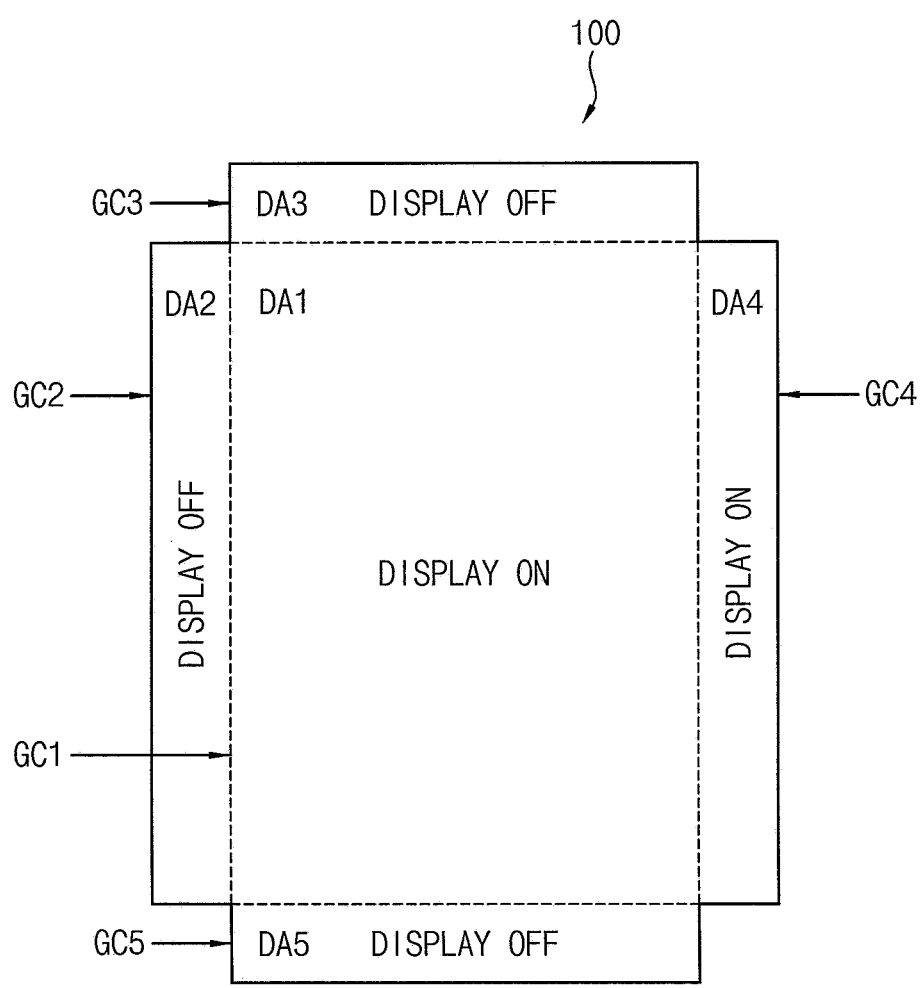
FIG. 5 is a schematic diagram illustrating an example of a display panel having a plurality of display area in the all-around display device of FIG. 1.
Figure 6:
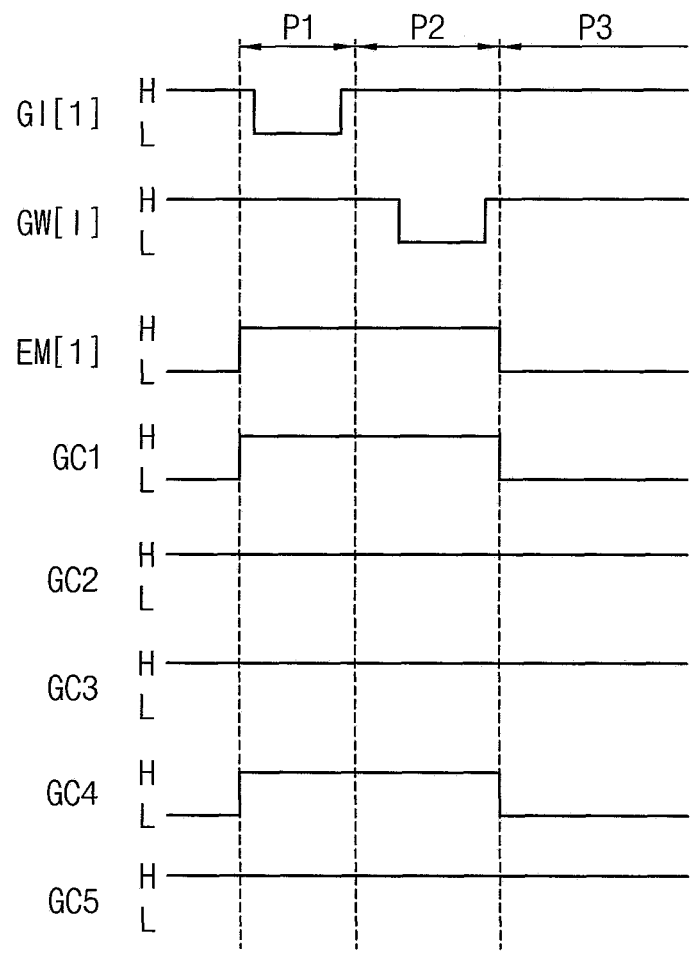
FIG. 6 is a timing diagram illustrating an example of global control signals applied to the display areas of FIG. 5.

FIG. 5 is a schematic diagram illustrating an example of a display panel having a plurality of display area in the all-around display device of FIG. 1. FIG. 6 is a timing diagram illustrating an example of global control signals applied to the display areas of FIG. 5.

Referring to FIGS. 5 and 6, the display panel 100 may include a plurality of display areas. For example, the display panel 100 may include first to fifth display areas DA1 to DA5. First to fifth global control signals GC1 to GC5 may be applied to the first to fifth display areas DA1 to DA5, respectively.

In some embodiments, the first to fifth global control signals GC1 to GC5 may be controlled by respective independent clock signals. Thus, the first to fifth display areas DA1 to DA5 may be selectively driven.

Each of the first to fifth display areas DA1 to DA5 may include a plurality of pixels. As illustrated in FIG. 5, the first display area DA1 and the fourth display area DA4 display images, and the second display area DA2, the third display area DA3, and the fifth display area DA5 do not (currently) display an image. That is, the pixels in the second, third, and fifth display areas DA2, DA3, and DA5 do not (currently) emit light.

As illustrated in FIG. 6, a first initialization signal GI[1] corresponding to a first pixel row (e.g., a first initialization line) may have an active level L in the first period P1, a first gate signal GW[1] corresponding to the first pixel row (e.g., a first gate line) may have an active level L in the second period P2, and a first emission control signal EM[1] corresponding to the first pixel row (e.g., a first emission control line) may have an active level L in the emission period P3.

Here, the second global control signal GC2, the third global control signal GC3, and the fifth global control signal GC5 may maintain the inactive level H, and the second display area DA2, the third display area DA3, and the fifth display area DA5 may be in non-emission state. The first and fourth global control signals GC1 and GC4 may change from the inactive level H to the active level L in synchronization with the first emission control signal EM[1]. In some embodiments, the first and fourth global control signals GC1 and GC4 may have the same waveform as the first emission control signal EM[1]. Accordingly, the seventh transistors T7 of the pixels included in the first and fourth display areas DA1 and DA4 may be maintained in a turn-on state after the first and second periods P1 and P2 for the first pixel row. Therefore, only the first and fourth display areas DA1 and DA4 can display an image.

However, this is an example, and the waveforms of the global control signals are not limited thereto. In some embodiments, the first global control signal GC1 may maintain the active level L in frames after an image display start frame, when the first display area DA1 displays the image during consecutive frames. Then, the voltage level of the first global control signal GC1 may be changed to the inactive level H when the image display ends.

In some embodiments, whether or not the first to fifth global control signals GC1 to GC5 are activated may be determined based on touch detection and touch position. For example, an activation command for a global control signal corresponding to a display area may be generated according to an algorithm (e.g., a predetermined algorithm) when a touch is detected in a specific pattern or when a touch is sensed in specific display areas. Accordingly, at least one of the first to fifth global control signals GC1 to GC5 may be synchronized with the first emission control signal EM [1] to have the same waveform as the first emission control signal EM [1].

As described above, the all-around display device 1000 according to embodiments may independently control the global control signals GC1 to GC5 that are independently provided to display areas so as to control driving and emitting of display areas. Therefore, the display areas may be selectively driven according to the needs of the user, and unnecessary power consumption may be reduced.

Figure 7:
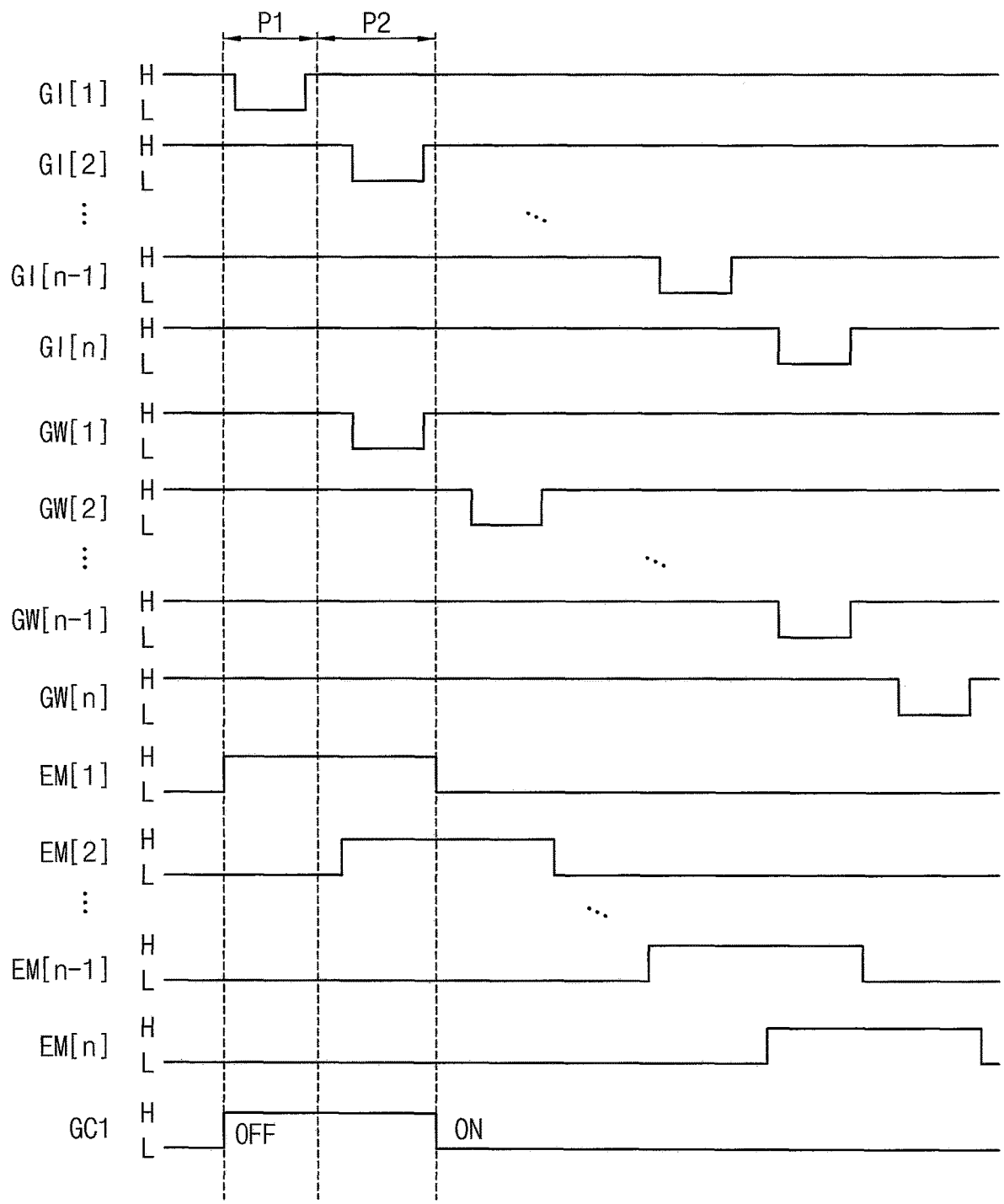
FIG. 7 is a timing diagram illustrating an example of signals applied to the display of the all-around display device of FIG. 1.

FIG. 7 is a timing diagram illustrating an example of signals applied to the display of the all-around display device of FIG. 1.

Referring to FIGS. 1, 2, and 7, the first global control signal GC1 may be output having the same waveform as the first emission control signal EM[1] when the first display area DA1 of the display panel 100 emits light.

The initialization signals GI[1] to GI[n] may be sequentially provided to the first to N-th initialization lines GIL[1] to GIL[n], respectively. The gate signals GW[1] to GW[n] may be sequentially provided to the first to N-th gate lines GWL[1] to GWL[n], respectively. In some embodiments, in the same pixel row, the gate signal may be a signal delayed by one horizontal period from the initialization signal. For example, the I-th initialization signal GI[i] may be substantially the same as the (I−1)-th gate signal GW[i−1].

The first global control signal GC1 may be simultaneously provided to all of the pixels included in the first display area DA1. Therefore, the seventh transistors included in the pixels of the first display area DA1 may be simultaneously or concurrently turned on or turned off. Light emission or driving of the entire first display area DA1 may be controlled by the first global control signal GC1.

Figure 8:
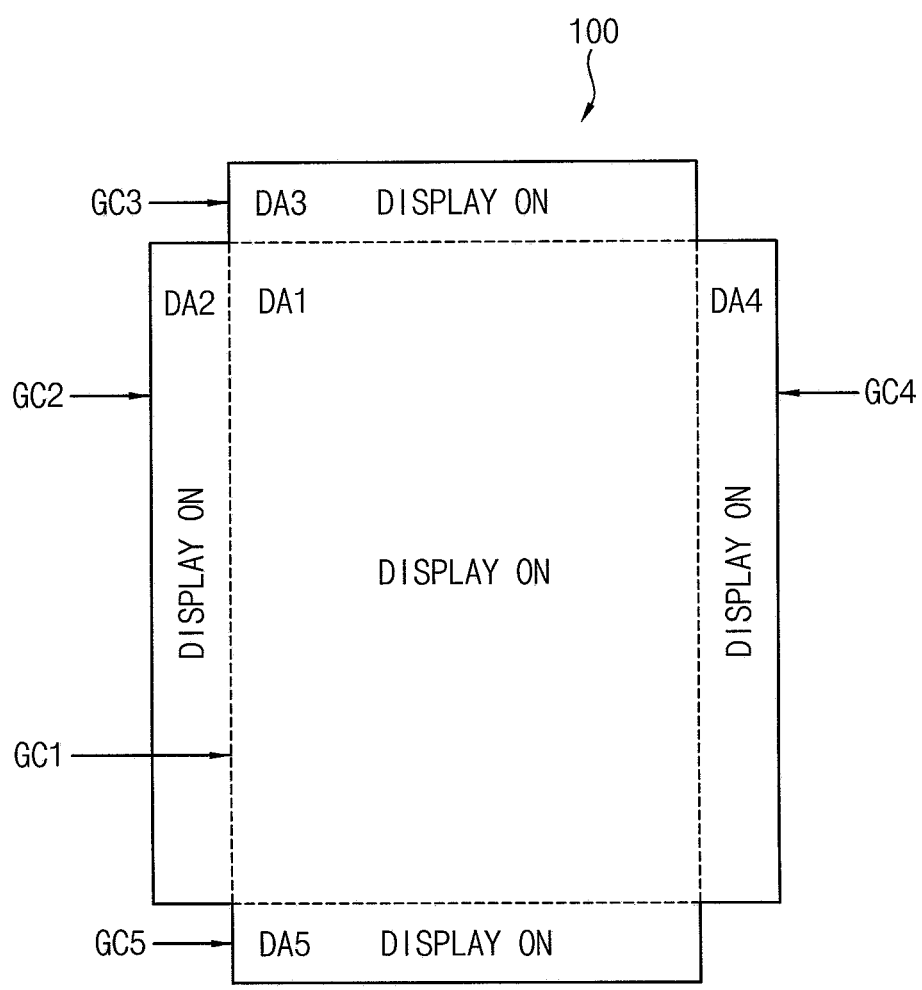
FIG. 8 is a schematic diagram illustrating an example of a display panel having a plurality of display area in the all-around display device of FIG. 1.
Figure 9:
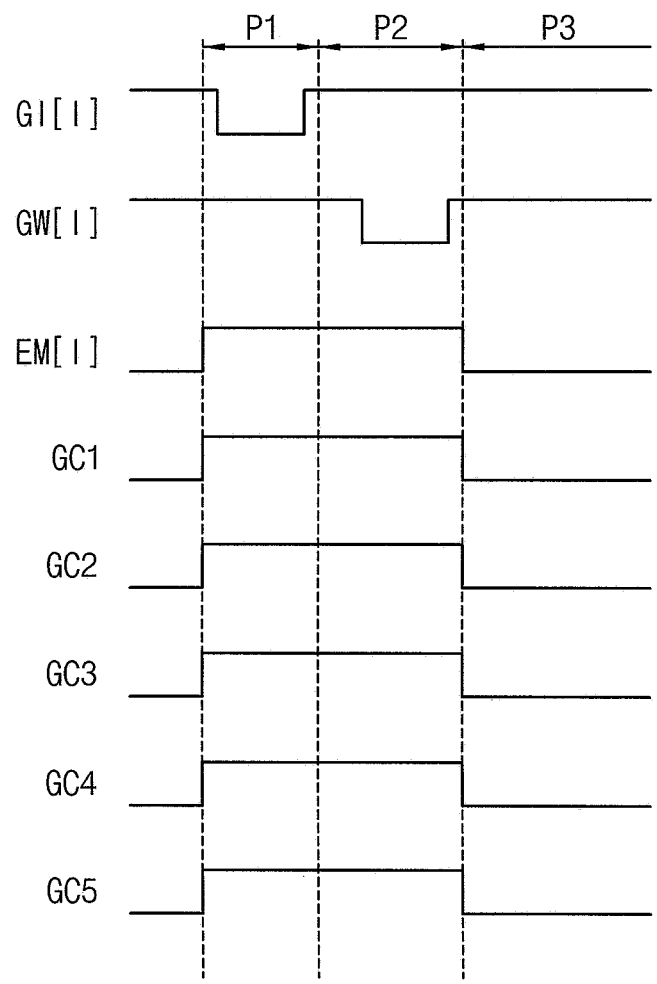
FIG. 9 is a timing diagram illustrating an example of global control signals applied to the display areas of FIG. 8.

FIG. 8 is a schematic diagram illustrating an example of a display panel having a plurality of display area in the all-around display device of FIG. 1. FIG. 9 is a timing diagram illustrating an example of global control signals applied to the display areas of FIG. 8.

Referring to FIGS. 8 and 9, the display panel 100 may include a plurality of display areas DA1 to DA5. For example, the display panel 100 may include first to fifth display areas DA1 to DA5. First to fifth global control signals GC1 to GC5 may be applied to the first to fifth display areas DA1 to DA5, respectively.

As illustrated in FIG. 8, all the first to fifth display areas DA1 to DA5 may emit light. In a first pixel row, a first initialization signal GI[1] corresponding to the first pixel row (e.g., a first initialization line) may have an active level L in the first period P1, a first gate signal GW[1] corresponding to the first pixel row (e.g., a first gate line) may have an active level L in the second period P2, and a first emission control signal EM[1] corresponding to the first pixel row (e.g., a first emission control line) may have an active level L in the emission period P3.

Here, the first to fifth global control signals GC1 to GC5 may change from the inactive level H to the active level L in synchronization with the first emission control signal EM[1]. In some embodiments, the first to fifth global control signals GC1 to GC5 may have the same waveform as the first emission control signal EM[1]. Accordingly, the seventh transistors T7 of the pixels included in the first to fifth display areas DA1 to DA5 may be maintained in the turn-on state after the first and second periods P1 and P2 for the first pixel row. Therefore, the first to fifth display areas DA1 to DA5 can display an image.

Figure 10:
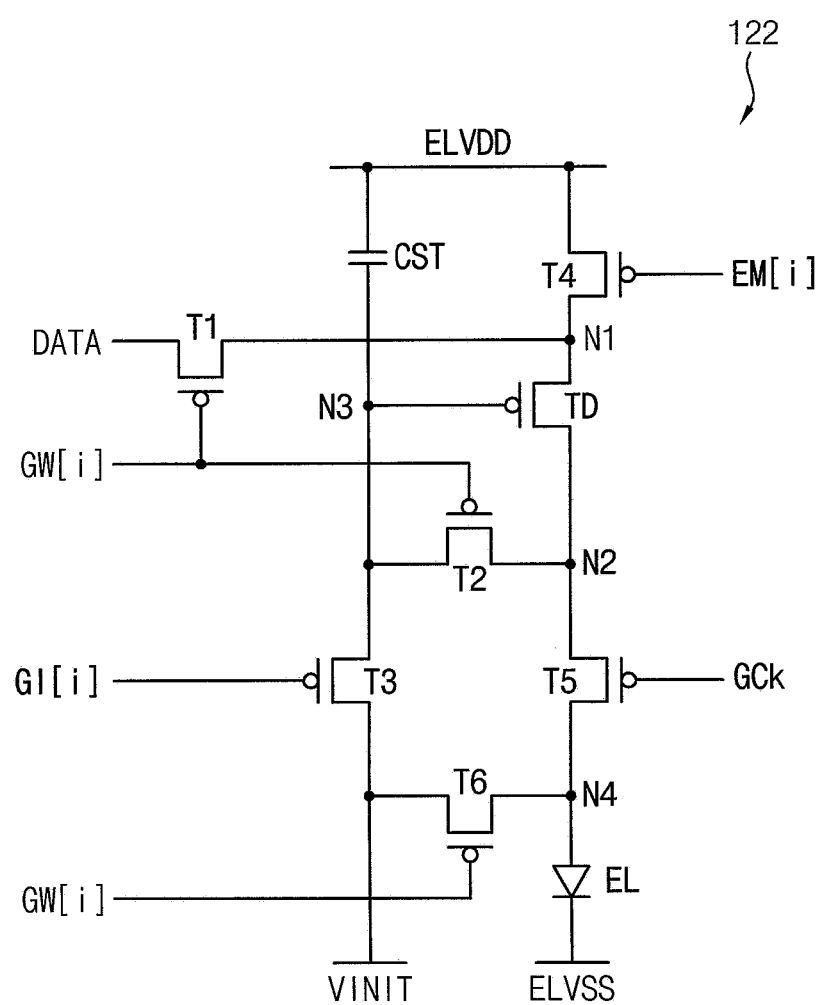
FIG. 10 is a circuit diagram illustrating an example of a pixel included in the all-around display device of FIG. 1.

FIG. 10 is a circuit diagram illustrating an example of a pixel included in the all-around display device of FIG. 1.

In FIG. 10, like reference numerals are used to designate elements of the pixel that are the same as those in FIG. 3, and repeated detailed description of these elements may be omitted. The pixel of FIG. 10 may be substantially the same as, or similar to, the pixel of FIG. 3 except for the fourth, fifth, and seventh transistors.

Referring to FIG. 10, the pixel 122 may include a driving transistor TD, first to sixth transistors T1 to T6, a storage capacitor CST, and an organic light emitting diode EL. The pixel 122 may be arranged in an l-th pixel row, where I is a positive integer that is less than or equal to n.

The driving transistor TD may provide a driving current corresponding to a data signal DATA to the organic light emitting diode EL. The first transistor T1 may provide the data signal DATA to the first node N1 in response to the gate signal GW[i]. The second transistor T2 may electrically connect the second node N2 and the third node N3 (e.g., may electrically connect a second electrode of the driving transistor TD and the gate electrode of the driving transistor TD) in response to the gate signal GW[i]. Thus, the threshold compensation operation of the driving transistor TD may be performed. The third transistor T3 may provide the initialization voltage VINT to the third node N3 (e.g., the gate electrode of the driving transistor TD) in response to the initialization signal GI[i]. The sixth transistor T6 may provide the initialization voltage VINT to the fourth node N4 (that is, to the anode electrode of the organic light emitting diode EL) in response to the gate signal GW[i].

The fourth transistor T4 may provide the first power supply voltage ELVDD to the first node N1 in response to the emission control signal EM[i]. The fourth transistor T4 may be connected between a first power source providing the first power supply ELVDD and the first node N1. The fourth transistor T4 may include a gate electrode to receive the emission control signal EM[i].

The fifth transistor T5 may electrically connect the driving transistor TD and the anode electrode of the organic light emitting diode EL in response to a K-th global control signal GCk. The fifth transistor T5 may be connected between the second node N2 and the fourth node N4. A gate electrode of the fifth transistor T5 may receive the K-th global control signal GCk. The K-th global control signal GCk may be simultaneously applied to a K-th display area among a plurality of the display areas.

Thus, the signals provided to the gate electrodes of the fourth and fifth transistors T4 and T5 controlling the light emission of the pixel 122 may be separated, or individually controlled. The timing of the signals provided to the pixel 122 may be substantially the same as the timing of FIG. 4.

Because the K-th global control signal GCk performs substantially the same function as the emission control signal EM[i] when the pixel 122 has to emit light, the organic light emitting diode EL may emit light having a luminance corresponding to the data voltage DATA.

When the pixel 122 should not emit light, or is not intended to emit light, the fifth transistor T5 may be turned off based on the K-th global control signal GCk. At this time, because the anode voltage of the organic light emitting diode EL has already been initialized, the organic light emitting diode EL does not inadvertently emit light and does not affect the data voltage DATA.

Thus, the light emissions of the display areas may be selectively and independently controlled by the global control signals. Further, the light emission of the pixels included in each display area may be controlled in common within one frame by each of the global control signals.

Figure 11:
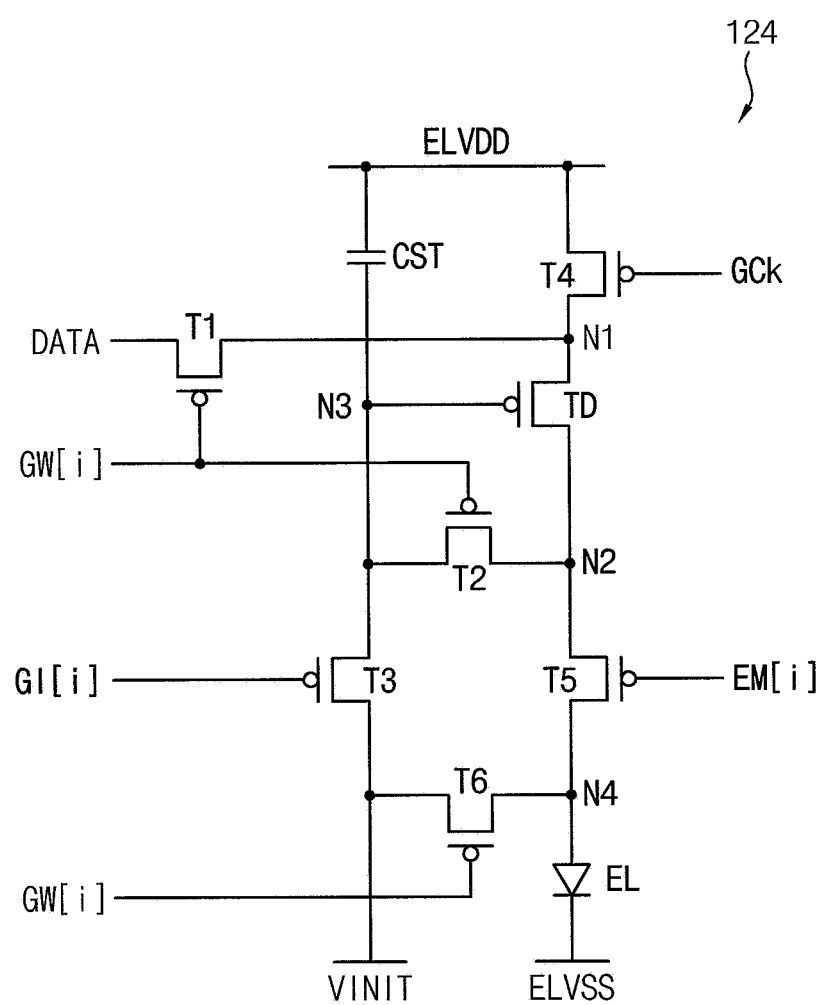
FIG. 11 is a circuit diagram illustrating an example of a pixel included in the all-around display device of FIG. 1.

FIG. 11 is a circuit diagram illustrating an example of a pixel included in the all-around display device of FIG. 1.

In FIG. 11, like reference numerals are used to designate elements of the pixel that are the same as those in FIG. 10, and repeated detailed description of these elements may be omitted. The pixel of FIG. 11 may be substantially the same as, or similar to, the pixel of FIG. 3 except for the fourth and fifth transistors.

Referring to FIG. 11, the pixel 124 may include a driving transistor TD, first to sixth transistors T1 to T6, a storage capacitor CST, and an organic light emitting diode EL. The pixel 124 may be arranged in an I-th pixel row, where I is a positive integer less than or equal to n.

The driving transistor TD may provide a driving current corresponding to a data signal DATA to the organic light emitting diode EL. The first transistor T1 may provide the data signal DATA to the first node N1 in response to the gate signal GW[i]. The second transistor T2 may electrically connect the second node N2 and the third node N3 (e.g., may electrically connect a second electrode of the driving transistor TD and the gate electrode of the driving transistor TD) in response to the gate signal GW[i]. Thus, the threshold compensation operation of the driving transistor TD may be performed. The third transistor T3 may provide the initialization voltage VINT to the third node N3 (e.g., to the gate electrode of the driving transistor TD) in response to the initialization signal GIN. The sixth transistor T6 may provide the initialization voltage VINT to the fourth node N4 (that is, to the anode electrode of the organic light emitting diode EL) in response to the gate signal GW[i].

The fourth transistor T4 may provide the first power supply voltage ELVDD to the first node N1 in response to the emission control signal EM[i]. The fourth transistor T4 may be connected between a first power source providing the first power supply ELVDD and the first node N1. The fourth transistor T4 may include a gate electrode to receive the K-th global control signal GCk. The K-th global control signal GCk may be simultaneously or concurrently applied to a K-th display area among a plurality of the display areas.

The fifth transistor T5 may electrically connect the driving transistor TD and the anode electrode of the organic light emitting diode EL in response to the emission control signal EM[i]. The fifth transistor T5 may be connected between the second node N2 and the fourth node N4. A gate electrode of the fifth transistor T5 may receive the emission control signal EM[i].

Thus, the signals provided to the gate electrodes of the fourth and fifth transistors T4 and T5 for controlling the light emission of the pixel 124 may be separated and individually controlled. The timing of the signals provided to the pixel 124 may be substantially the same as the timing of FIG. 4.

Because the K-th global control signal GCk performs substantially the same function as the emission control signal EM[i] when the pixel 124 is to emit light, the organic light emitting diode EL may emit light at a luminance corresponding to the data voltage DATA.

When the pixel 124 should not emit light, the fourth transistor T4 may be turned off based on the K-th global control signal GCk. At this time, because the anode voltage of the organic light emitting diode EL and the gate voltage of the driving transistor TD have already been initialized, the organic light emitting diode EL does not inadvertently emit light and does not affect the data voltage DATA.

As described above, the all-around display device having the pixels according to the described embodiments may selectively and independently control the light emission of each of the display areas based on the global control signals. Further, the light emission of the pixels included in each display area may be controlled in common within each frame by the global control signals. Therefore, the display areas may be selectively driven according to the needs of the user, and unnecessary power consumption may be reduced.

The present embodiments may be applied to any display device and to any system including the display device. For example, the present embodiments may be applied to a television, a computer monitor, a laptop, a digital camera, a cellular phone, a smart phone, a smart pad, a personal digital assistant (PDA), a portable multimedia player (PMP), a MP3 player, a navigation system, a game console, a video phone, head-mounted display, etc.

The foregoing is illustrative of embodiments, and is not to be construed as limiting thereof. Although a few embodiments have been described, those skilled in the art will readily appreciate that many modifications are possible in the embodiments without materially departing from the novel teachings and aspects of embodiments. Accordingly, all such modifications are intended to be included within the scope of embodiments as defined in the claims. In the claims, means-plus-function clauses are intended to cover the structures described herein as performing the recited function and not only structural equivalents but also equivalent structures. Therefore, it is to be understood that the foregoing is illustrative of embodiments and is not to be construed as limited to the specific embodiments disclosed, and that modifications to the disclosed embodiments, as well as other embodiments, are intended to be included within the scope of the appended claims. The inventive concept is defined by the following claims, with equivalents of the claims to be included therein.

What is claimed is:

1. An all-around display device comprising:
    a display panel comprising first to J-th display areas each having a plurality of pixels and respectively corresponding to a plurality of surfaces;
    a gate driver for providing a gate signal to the display panel through first to N-th gate lines, and for providing an initialization signal to the display panel through first to N-th initialization lines;
    an emission driver for providing an emission control signal to the display panel through first to N-th emission control lines;
    a display area control driver for providing first to J-th global control signals respectively corresponding to the first to J-th display areas to selectively determine light emission of each of the first to J-th display areas; and
    a data driver for providing a data voltage to the display panel through data lines,
    wherein J is an integer that is greater than 1, and N is an integer that is greater than J,
    wherein each of the pixels comprises:
        a fourth transistor connected between a first power source for providing a first power voltage and a first node, and comprising a gate electrode to receive the emission control signal;
        a fifth transistor connected between a second node and a fourth node, and comprising a gate electrode to receive the emission control signal; and
        a seventh transistor connected between an emission control line and both of the gate electrodes of the fourth and fifth transistors, and comprising a gate electrode to receive one of the first to J-th global control signals.

2. The all-around display device of claim 1, wherein each of the pixels comprises:
    a first transistor connected between a data line and the first node, and comprising a gate electrode to receive the gate signal;

a driving transistor for generating a driving current, and connected between the first node and the second node, and comprising a gate electrode connected to a third node;

a second transistor connected between the second node and the third node, and comprising a gate electrode to receive the gate signal;

a third transistor connected between the third node and an initialization power source for providing an initialization voltage, and comprising a gate electrode to receive an initialization signal;

a sixth transistor connected between the initialization power source and the fourth node, and comprising a gate electrode to receive the gate signal;

a storage capacitor connected between the first power source and the third node; and an organic light emitting diode connected between the fourth node and a second power source for providing a second power voltage that is less than the first power voltage.

3. The all-around display device of claim 2, wherein the display area control driver is for outputting an active level of a K-th global control signal corresponding to a K-th display area to display an image, where K is a positive integer that is less than or equal to J.

4. The all-around display device of claim 3, wherein the K-th global control signal corresponding to the K-th display area has the same waveform as the emission control signal applied to the first emission control line.

5. The all-around display device of claim 3, wherein the display area control driver is for outputting an inactive level of an I-th global control signal corresponding to an I-th display area to prevent an image from being displayed thereon, where I is a positive integer that is less than or equal to J.

6. The all-around display device of claim 5, wherein the emission control signal is prevented from being applied to the gate electrodes of the fourth transistor and the fifth transistor by the I-th global control signal having the inactive level.

7. The all-around display device of claim 3, wherein the K-th global control signal maintains the active level in frames after an image display start frame when the K-th display area displays the image during consecutive frames.

8. The all-around display device of claim 2, wherein a non-emission period in which the emission control signal has an inactive level comprises:

a first period for initializing a voltage of the third node; and a second period after the first period for writing the data voltage, for compensating a threshold voltage of the driving transistor, and for initializing a voltage of the fourth node.

9. The all-around display device of claim 8, wherein, in the first period, the initialization signal has an active level, and the gate signal has an inactive level.

10. The all-around display device of claim 8, wherein, in the second period, the initialization signal has an inactive level, and the gate signal has an active level.

11. The all-around display device of claim 1, wherein the display panel is a flexible display panel in which each boundary between adjacent ones of the surfaces is bent.

12. The all-around display device of claim 1, further comprising:

a touch driver for detecting a touch on the display panel; and a timing controller for controlling the gate driver, the emission driver, the display area control driver, the data driver, and the touch driver.

13. The all-around display device of claim 12, wherein the display area control driver is for outputting a global control signal that corresponds to a touched display area of the first to J-th display areas and that is at an active level during an active period of the emission control signal applied to the first emission control line.

14. The all-around display device of claim 12, wherein the timing controller is for providing a control signal to the display area control driver to determine whether to activate any or all of the first to J-th global control signals based on a touch detection that is output from the touch driver.

15. The all-around display device of claim 1, wherein a K-th global control signal is applied commonly to the pixels in a K-th display area, K being a positive integer that is less than or equal to J.

16. An all-around display device comprising:

a display panel comprising first to J-th display areas each having a plurality of pixels and respectively corresponding to a plurality of surfaces;

a gate driver for providing a gate signal to the display panel through first to N-th gate lines, and for providing an initialization signal to the display panel through first to N-th initialization lines;

an emission driver for providing an emission control signal to the display panel through first to N-th emission control lines;

a display area control driver for providing first to J-th global control signals respectively corresponding to the first to J-th display areas to selectively determine light emission of each of the first to J-th display areas; and a data driver for providing a data voltage to the display panel through data lines, wherein J is an integer that is greater than 1, and N is an integer that is greater than J, wherein each of the pixels comprises:

a fourth transistor connected between a first power source for providing a first power voltage and a first node, and comprising a gate electrode; and a fifth transistor connected between a second node and a fourth node, and comprising a gate electrode, wherein one of the gate electrode of the fourth transistor and the gate electrode of the fifth transistor is configured to receive the emission control signal, and the other of the gate electrode of the fourth transistor and the gate electrode of the fifth transistor is configured to receive one of the first to J-th global control signals corresponding to a display area comprising the pixel.

17. The all-around display device of claim 16, wherein each of the pixels further comprises:

a first transistor connected between a data line and a first node, and comprising a gate electrode to receive the gate signal;

a driving transistor for generating a driving current, connected between the first node and the second node, and comprising a gate electrode connected to a third node;

a second transistor connected between the second node and the third node, and comprising a gate electrode to receive the gate signal;

a third transistor connected between the third node and an initialization power source for providing an initialization voltage, and comprising a gate electrode to receive an initialization signal;

a sixth transistor connected between the initialization power source and the fourth node, and comprising a gate electrode to receive the gate signal;

a storage capacitor connected between the first power source and the third node; and an organic light emitting diode connected between the fourth node and a second power source for providing a second power voltage that is less than the first power voltage.

18. The all-around display device of claim 17, wherein a K-th global control signal corresponding to a K-th display area has an active level during an active period of the emission control signal applied to the first emission control line to display an image on the K-th display area, where K is a positive integer that is less than or equal to J.

19. A pixel, comprising:

a first transistor connected between a data line and a first node, and comprising a gate electrode to receive a K-th gate signal;

a driving transistor for generating a driving current, connected between the first node and a second node, and comprising a gate electrode connected to a third node;

a second transistor connected between the second node and the third node, and comprising a gate electrode to receive the K-th gate signal;

a third transistor connected between the third node and an initialization power source for providing an initialization voltage, and comprising a gate electrode to receive a K-th initialization signal;

a fourth transistor connected between a first power source for providing a first power voltage and the first node, and comprising a gate electrode to receive a K-th emission control signal;

a fifth transistor connected between the second node and a fourth node, and comprising a gate electrode to receive the K-th emission control signal;

a sixth transistor connected between the initialization power source and the fourth node, and comprising a gate electrode to receive the K-th gate signal;

a seventh transistor connected between an emission control line and both of the gate electrodes of the fourth and fifth transistors, and comprising a gate electrode to receive a global control signal;

a storage capacitor connected between the first power source and the third node; and an organic light emitting diode connected between the fourth node and a second power source for providing a second power voltage that is less than the first power voltage, wherein K is an integer that is greater than 0.

20. The pixel of claim 19, wherein the K-th emission control signal is prevented from being applied to the gate electrodes of the fourth transistor and the fifth transistor by the global control signal having an inactive level.

* * * * *